US011281354B1

(12) United States Patent
Gelfuso et al.

(10) Patent No.: US 11,281,354 B1
(45) Date of Patent: Mar. 22, 2022

(54) DIGITAL NAVIGATION MENU OF SWIPEABLE CARDS WITH DYNAMIC CONTENT

(71) Applicant: Amazon Technologies, Inc., Seattle, WA (US)

(72) Inventors: Jeff Gelfuso, Sammamish, WA (US); Anna Maria Godfrey, Seattle, WA (US); Mintoo Kakati, San Francisco, CA (US); Timothy Whalin, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 391 days.

(21) Appl. No.: 15/619,861

(22) Filed: Jun. 12, 2017

(51) Int. Cl.
  *G06F 3/048* (2013.01)
  *G06F 3/04817* (2022.01)
  *G06F 3/0488* (2022.01)
  *G06Q 30/06* (2012.01)
  *G06Q 30/02* (2012.01)
  *G06F 16/9535* (2019.01)

(52) U.S. Cl.
  CPC ........ *G06F 3/04817* (2013.01); *G06F 3/0488* (2013.01); *G06F 16/9535* (2019.01); *G06Q 30/0255* (2013.01); *G06Q 30/0631* (2013.01); *G06Q 30/0643* (2013.01)

(58) Field of Classification Search
  CPC .............. G06F 3/04817; G06F 3/0488; G06F 16/9535; G06Q 30/0255; G06Q 30/0631; G06Q 30/0643
  See application file for complete search history.

(56) References Cited

U.S. PATENT DOCUMENTS

| 7,082,426 | B2* | 7/2006 | Musgrove | G06Q 20/04 |
| 9,654,598 | B1* | 5/2017 | Crawford | H04W 4/023 |
| 10,055,184 | B1* | 8/2018 | Ferrell | G06F 3/0482 |
| 2005/0210416 | A1* | 9/2005 | MacLaurin | G06F 3/0483 715/851 |
| 2005/0223310 | A1* | 10/2005 | Wachholz-Prill | G06F 16/954 715/206 |
| 2008/0120533 | A1* | 5/2008 | Lazier | G06F 3/1415 715/234 |
| 2008/0120658 | A1* | 5/2008 | Cubillo | H04N 21/435 725/91 |

(Continued)

*Primary Examiner* — Mahelet Shiberou
(74) *Attorney, Agent, or Firm* — Eversheds-Sutherland (US) LLP

(57) ABSTRACT

Systems, methods, and computer-readable media are disclosed for digital navigation menus of swipeable cards with dynamic content. Example methods may include determining a first request from a mobile device for digital content to be presented at a plurality of cards in a digital navigation menu. The plurality of cards may include floating user interface elements that can be swiped in succession. Example methods may include determining a first card of the plurality of cards, and determining a second card of the plurality of cards, the second card having third content on a first side and fourth content on a second side. The third content may include an image-based representation of a first text-based link. Example methods may include sending first data associated with the first card and second data associated with the second card to the mobile device, and causing the first card to be presented at a display.

17 Claims, 10 Drawing Sheets

(56) References Cited

U.S. PATENT DOCUMENTS

| | | | |
|---|---|---|---|
| 2009/0043674 A1* | 2/2009 | Minsky | G06Q 30/0633 705/26.8 |
| 2009/0106113 A1* | 4/2009 | Arora | G06Q 30/0251 705/14.53 |
| 2012/0011437 A1* | 1/2012 | James | G06F 1/1643 715/702 |
| 2012/0159294 A1* | 6/2012 | Gonsalves | G06Q 30/0601 715/205 |
| 2012/0191567 A1* | 7/2012 | Williams | G06Q 20/12 705/26.8 |
| 2012/0313876 A1* | 12/2012 | Smith | G06F 3/0488 345/173 |
| 2013/0111395 A1* | 5/2013 | Ying | G06T 13/80 715/783 |
| 2013/0166471 A1* | 6/2013 | Fukuda Kelley | G06F 16/958 705/344 |
| 2013/0254002 A1* | 9/2013 | Isaacson | G06Q 30/0207 705/14.23 |
| 2014/0033047 A1* | 1/2014 | Poling | G06F 40/123 715/730 |
| 2014/0059496 A1* | 2/2014 | White | G06F 3/0488 715/841 |
| 2014/0137020 A1* | 5/2014 | Sharma | G06F 3/0486 715/769 |
| 2014/0164938 A1* | 6/2014 | Petterson | G06F 3/0482 715/739 |
| 2015/0039475 A1* | 2/2015 | Sterling | G06F 16/951 705/26.62 |
| 2015/0113436 A1* | 4/2015 | Penha | G06F 3/0481 715/752 |
| 2015/0193857 A1* | 7/2015 | Reed | G06Q 30/0633 705/26.8 |
| 2016/0104205 A1* | 4/2016 | Greenberg | G06Q 30/0272 705/14.68 |
| 2017/0249768 A1* | 8/2017 | Dhua | G06T 3/0012 |
| 2018/0011854 A1* | 1/2018 | Yi | G06N 20/00 |

* cited by examiner

DIGITAL NAVIGATION MENU OF SWIPEABLE CARDS WITH DYNAMIC CONTENT

BACKGROUND

Mobile applications may include navigation menus that can be used to navigate through different portions of the respective mobile application. For example, a navigation menu may include links such as "help," "about," "contact us," and other links that direct a user to different portions or content related to the mobile application. Such navigation menus may be static, in that the navigation menu contains the same links and/or options until the mobile application is updated. Some navigation menus cause the user to "spearfish" for the particular content or portion of the mobile application they intend to consume or view. Accordingly, users may not be exposed to content that may be of interest to the particular user when using a navigation menu of a device application.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
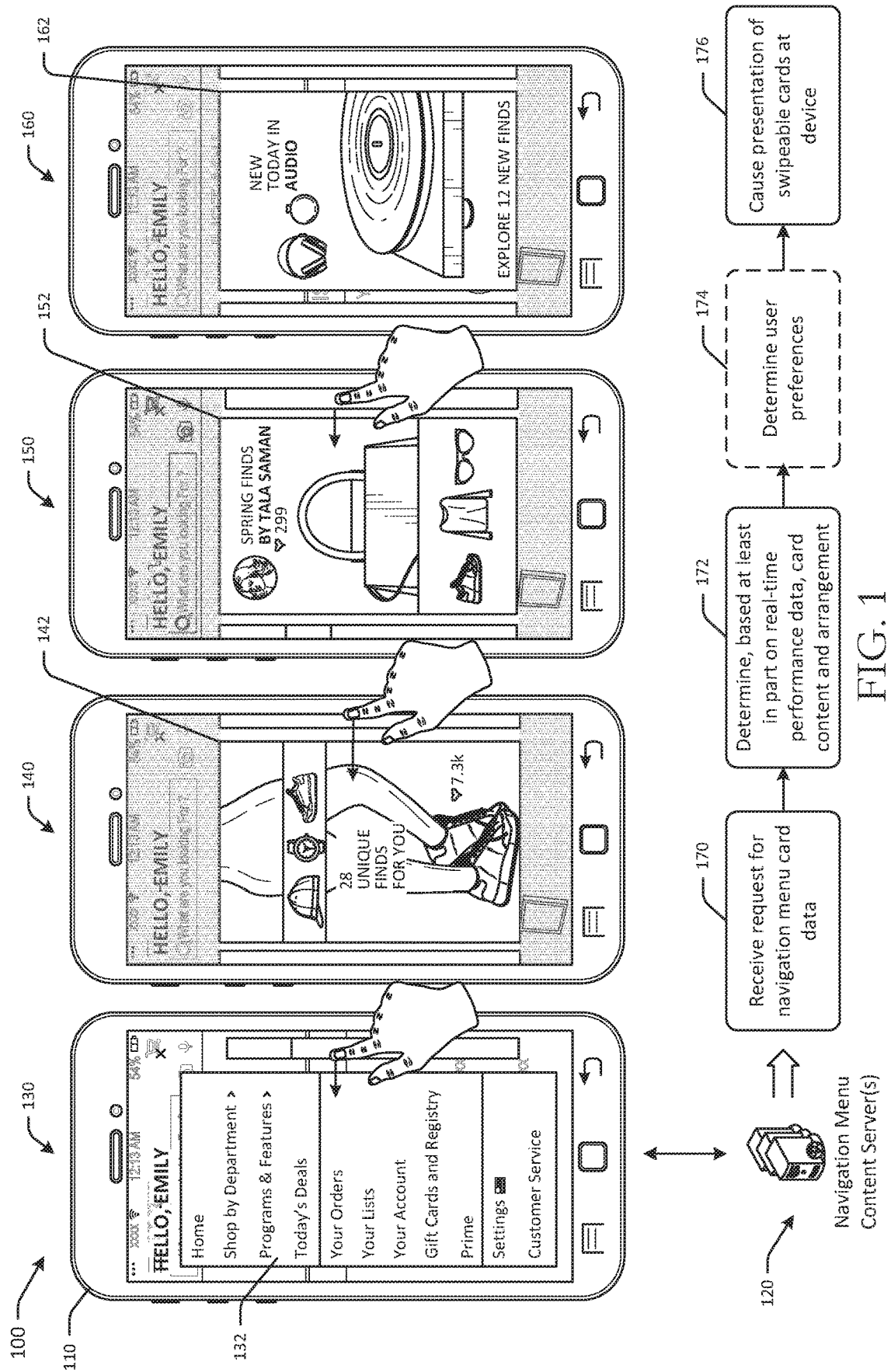
FIG. 1 is a schematic diagram of an example use case illustrating digital navigation menus of swipeable cards with dynamic content in accordance with one or more example embodiments of the disclosure.

Users may use navigation menus of mobile applications or other computer applications (e.g., laptop/desktop computing applications, etc.) to navigate through one or more portions of the respective application. Accordingly, users may naturally spend time interacting with a navigation menu of a digital application, so as to navigate to desired content or to a specific portion of the application. Therefore, digital navigation menus that provide dynamic content that may be relevant to the user of the device and/or the application may have an increased probability of being consumed by the user, and may be relevant to the user's goal and/or intent when using the application.

Embodiments of the disclosure include digital navigation menus with swipeable cards that have dynamic content for presentation to a user of an application. The swipeable cards may be floating user interface elements that can be manipulated using a number of user interactions, such as taps, clicks, swipes, flips, gestures, and other interactions. In some embodiments, one or more swipeable cards may have different content on a front side, or a first side, and a back side, or a second side, of the digital card. For example, first content, such as an image, may be on a front side of the card that is presented to a user initially, and the user may swipe up on, or flip, the card to see the back side of the card, which may include text or other content related to the image on the front side. The swipeable cards may be accessible from, and in some embodiments only accessible from, the navigation menu of the application. Accordingly, when a user opens the navigation menu, the swipeable cards may be accessible and/or presented to the user.

Content, such as images, audio, video, text, links, and other content, that is included in the swipeable cards may be provided by one or more remote servers, such as a navigation menu content server. The content may be provided in groups, such as in batches of three cards, five cards, or another number of cards, or on an as-needed basis, such as after a user has interacted with one or more of the cards, or has consumed all of the previously sent cards. Therefore, content provided on the cards may be updated periodically, such as daily, without requiring updates to the application itself.

Content may be sourced from an online community that is associated with the user of the application. For example, if the user is subscribed to a particular online community or service, content related to or generated by that community or service may be aggregated for presentation to the user, so as to increase a likelihood of relevance of the content to the user. Card content may include functionality, such as video playback, audio playback, user input functionality (e.g., note taking, text-based conversations, voice-based conversations, etc.), purchase initiation or shipment initiation functionality, and other functionality that may be contained within a boundary of the card. Users may therefore engage in or utilize card functionality without exiting the card or the application. User interactions may be monitored and/or tracked over time to improve card content selection with respect to a particular user's preferences. For example, card view time and subsequent user interaction may be monitored to determine whether a user consumed a card and was not interested in its linked content. Card boundaries may dynamically be adjusted based at least in part on initiated functionality, a presently presented side of the card, and other factors. In some embodiments, card content may be personalized based at least in part on a user profile, such as previous user interactions, purchase or browse histories, and other historical data. Cards may be shared, favorited, saved, liked, and other interactions.

Cards may be presented in a particular order and may include dynamic colors, fonts, text, and other features that can be modified based at least in part on performance results of various combinations of the card. For example, a number of different combinations of background colors, fonts, text or labeling, card layouts, card sizes, and other features may be generated and sent to different users. The resultant user interaction performance, consumption performance, or other performance metric may be monitored and/or determined. For example, devices may send interaction data to a remote server. The remote server may evaluate data received from a number of different devices connected to the server and may determine which combinations of card content perform better over time. Based at least in part on the performance data, the remote server may determine which combinations to use for future card requests, as well as to push updates to for devices that have received different card data but have not yet presented the card. For example, if a card has not yet been presented, content associated with the card may be modified or replaced with other content.

This disclosure relates to, among other things, devices, systems, methods, computer-readable media, techniques, and methodologies for digital navigation menus of swipeable cards with dynamic content. Certain embodiments may therefore provide a community-centric browsing experience in the navigation menu of an application. Card content may be aggregated from a number of different and diverse users and presented in the navigation menu. Content may include categories such as new and interesting finds, things most bookmarked by other users, collections, user's posts about products, engaging discussions in varied interests, updates from people and brands followed, media from favorite artists or shows, and/or other categories.

Referring to FIG. 1, an example use case for digital navigation menus of swipeable cards with dynamic content is illustrated in accordance with one or more embodiments of the disclosure. In FIG. 1, a number of user interfaces 100 are presented as part of an initial navigation menu 132 of a mobile application. As illustrated at a first user interface 130, the initial navigation menu 132 may be presented at a mobile device 110. The mobile device 110 may be in communication with one or more remote servers, such as a navigation menu content server 120. In some embodiments, the initial navigation menu 132 may be presented in response to a user selection of an icon or other portion of a user interface, while in other embodiments, the initial navigation menu 132 may be presented automatically as an initial user interface of the application. The initial navigation menu 132 may be used to navigate to particular content and/or to a specific portion of the mobile application, as well as to access one or more swipeable cards.

In the example of FIG. 1, a user of the device 110 may access the swipeable cards by swiping the initial navigation menu 132 left. Other embodiments may present swipeable cards in a different manner or in response to a different user interaction with the initial navigation menu 132. At a second user interface 140, a first card 142 may be presented at the device 110. The first card 142 may be a part of the navigation menu. In some embodiments, the first card 142 may be accessible only from the navigation menu. The first card 142 may be a floating user interface element and may have a boundary, such as the rectangle illustrated in FIG. 1. Other boundaries may be circular, oval, elliptical, triangular, star-shaped, and other geometries. The user of the device 110 may manipulate or otherwise interact with the first card 142 to access or consume additional content or functionality. For example, the user may flip the first card 142 by swiping up or down to reveal a back side of the first card 142 with different content. For example, the first card 142 may have a front side that is illustrated in FIG. 1, which indicates that there are 28 unique finds for the user, and the back side of the first card 142 may have a list of the 28 items, as well as purchase functionality.

The first card 142 may be the first card in a series of swipeable cards that the user can swipe through to consume. For example, the user may swipe over the first card 142, and, at a third user interface 150, a second card 152 may be presented. The second card 152 may include content that is related to or unrelated to the content of the first card 142. For example, the content of the second card 152 (as shown on the front side of the second card 142) may relate to spring finds, and may therefore be related to the first card 142 since it may describe interesting finds for the user. In some embodiments, only one side of one card, or only one card, may be presented at a time on the device 110.

The user may swipe past the second card 152 to proceed to a third card 162 at a fourth user interface 160. The content of the third card 162 may relate to new audio and may therefore be unrelated to the content of the other cards. The user may therefore swipe through the cards and consume and/or find content that may be of interest to the user. Because the user may use the navigation menu to navigate through the application or to find particular content, the user may be exposed to new and/or potentially relevant content each time the navigation menu is used, as a result of the swipeable cards.

To determine the cards and/or card content for presentation, the device 110 may request content from the navigation menu content server 120. The navigation menu content server 120 may generate and/or determine one or more cards or content for presentation at the device. In the example process flow of FIG. 1, the navigation menu content server 120 may receive a request for navigation menu card data from the device 110 at operation 170. At operation 172, the navigation menu content server 120 may determine card content and arrangement based at least in part on real-time performance data. For example, the navigation menu content server 120 may select content for presentation at one or more cards, and may also determine an arrangement, or an order of presentation, for the generated cards. In some embodiments, the navigation menu content server 120 may generate a predetermined number of cards for delivery to the device 110, while in other embodiments, the navigation menu content server 120 may generate cards as needed or requested, or one by one. At optional operation 174, the navigation menu content server 120 may determine user preferences. The user preferences may be used to modify or adjust, or initially determine, an arrangement of the cards or card content. At operation 176, the navigation menu content server 120 may cause presentation of the swipeable cards at the device 110.

In some embodiments, the device 110 may determine a mobile application navigation menu that has or may obtain a series of swipeable cards. The device 110 may receive an indication to present the mobile application navigation menu, for example, by a user of the device clicking a hamburger menu option or the like. The device 110 may determine that a first card is presented at the mobile device, and may determine a first swipe gesture in a first direction on a display of the mobile device while the first card is presented. In response, the device 110 may determine that a second card is adjacent to the first card, and may cause to present, or may present, the second card at the mobile device. User interactions and functionality may include swiping up or down to flip the card. In-card actions or functionality may include sharing, hearting, purchases, playback, follow, etc. Cards may be saved for later access. Cards may expand, collapse, change shape, or otherwise dynamically adjust based at least in part on the card type or the user's interaction with the card. For example, a card may increase in size for a centerfold-like presentation of content. Cards may be collected into a group of cards and shared with others. Cards may be configured for in card comment and discussion. Cards may play video and other media content inline without leaving the card.

As described herein, swipeable cards may showcase images, videos, posts, editorial, music, and other content that may have been generated, in some embodiments, by a specific online community. Card content categories may include interesting finds or products or content that may be relevant to the user, audio or video content for consumption, how to guides, community (e.g., local or geographical community, etc.) news or events, time of day, seasonal and time based information, product recommendations (e.g., recommendations from favorite brands, artists, authors, etc.), similar user likes or interests, and the like. One or more, or all, cards may have multiple sides that can be presented based at least in part on user interactions with the respective card. Certain interactions may trigger functionality as well as a change in presented information. As a result, users may not have to navigate to each of the features or content presented on different sides of the card separately, or have to go back and forth between multiple sections in the application to discover the content. By being an extension of the navigation menu, the swipeable cards may effectively help users access content directly from any page in the application by simply initiating the navigation menu. Cards may be shared, favorited, saved, liked, and other interactions.

Embodiments of the disclosure may therefore include navigation menus with dynamic content featured in swipeable cards (that may be personalized to a user), rather than static lists of links. Swipeable cards may be used to browse content while in the navigation menu, and may allow users to browse and discover unique content. In some embodiments, text based navigation links may be combined with a card based visual user interface construct, thereby allowing both quick navigation to the respective links and serendipitous discovery of personalized content through cards.

The systems, methods, computer-readable media, techniques, and methodologies for digital navigation menus of swipeable cards with dynamic content may facilitate presentation of timely and relevant content to users leading to an increase in functionality for navigation menus of applications. As a result of improved functionality, users may consume and discover content directly from a navigation menu and without having to specifically identify or guide themselves to content that is relevant or of interest to the user.

Example embodiments of the disclosure provide a number of technical features or technical effects. For example, in accordance with example embodiments of the disclosure, certain embodiments of the disclosure may improve navigation menu functionality, reduce latency in presentation at devices by receiving predetermined card content, and determining real-time or near real-time performance data that can be used to update or modify various aspects of digital cards. Some embodiments may use machine learning to generate cards in an aesthetically pleasing manner, as determined based at least in part on user interactions with particular card aesthetics. Machine learning algorithms may be used to modify colors, shapes, placement, product selection, and other features of a card. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
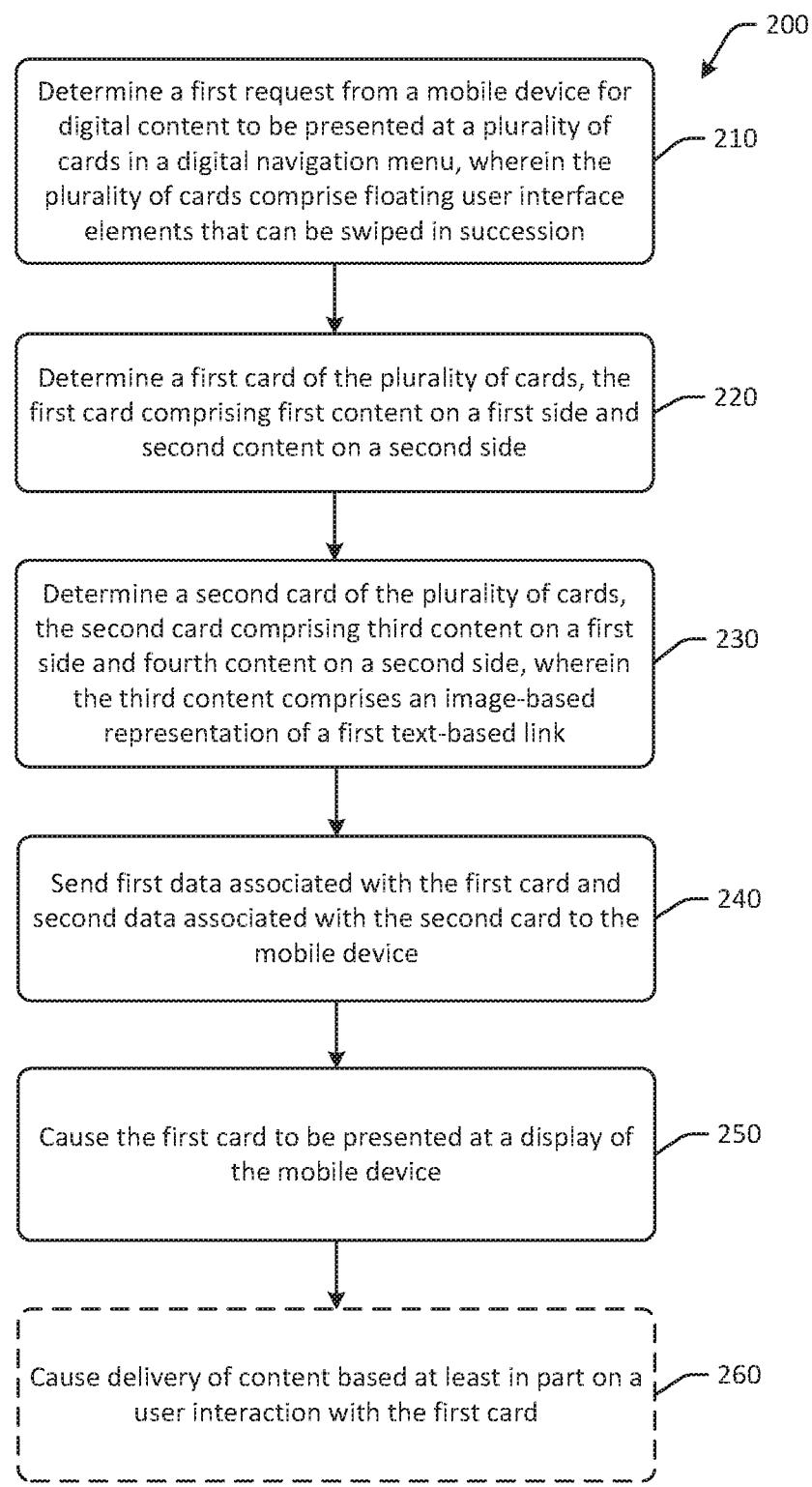
FIG. 2 is a schematic illustration of an example process flow for generating digital navigation menus of swipeable cards with dynamic content in accordance with one or more example embodiments of the disclosure.

FIG. 2 depicts an example process flow 200 for generating digital navigation menus of swipeable cards with dynamic content in accordance with one or more example embodiments of the disclosure. While example embodiments of the disclosure may be described in the context of navigation menus, it should be appreciated that the disclosure is more broadly applicable to main menus or menus accessible from most, if not all, portions, of an application. Some or all of the blocks of the process flows in this disclosure may be performed in a distributed manner across any number of devices. The operations of the process flow 200 may be performed in a different order.

At block 210, a first request from a mobile device for digital content to be presented at a plurality of cards in a digital navigation menu may be determined, wherein the plurality of cards comprise floating user interface elements that can be swiped in succession. For example, computer-executable instructions stored on a memory of a device may be executed to receive a request from a device for card content. The cards may be for presentation in a navigation menu of an application.

At block 220 of the process flow 200, a first card of the plurality of cards may be determined, the first card comprising first content on a first side and second content on a second side. For example, the first card may include one or more digital "sides," such as a front side and a back side, and in some instances additional sides, that each has different content and functionality. For example, a card may have text on one side, images on another side, product reviews on another side, order placement functionality on another side, and so forth. For example, computer-executable instructions stored on a memory of a device may be executed to determine a first card of the plurality of cards. The first card may be selected or determined based at least in part on the first card's performance metrics with other users. For example, cards that are popular or drive user engagement may be selected before other cards. Cards that are relevant to a specific user's interests may be selected before less relevant cards in some embodiments. In some instances, an order of presentation of cards may be determined based at least in part on a likelihood of relevance of the content of a particular card to a specific user or to a generic user.

At block 230 of the process flow 200, a second card of the plurality of cards may be determined, the second card comprising third content on a first side and fourth content on a second side, wherein the third content comprises an image-based representation of a first text-based link. For example, an image-based representation of a first text-based link may be an image that a user can interact with and be redirected, within the boundary of the card and without leaving the navigation menu, to the text-based link. For example, computer-executable instructions stored on a memory of a device may be executed to determine a second card for presentation to the user. The second card, or any card, may include images that can be interacted with to redirect the user to different content without leaving the navigation menu or application.

At block 240 of the process flow 200, first data associated with the first card and second data associated with the second card may be sent to the mobile device. For example, computer-executable instructions stored on a memory of a device may be executed to send first data associated with the first card and second data associated with the second card to the mobile device. The first data may include the card content for the first card, as well as functionality for selectable elements or other user interface elements that may be included for the card. The first data may include data for all sides of the card in some embodiments. In some embodiments, a single data file may be sent for more than one card. The first data may include instructions for a first response to a first user interaction with the first card, and a second response to a second user interaction with the first card. For example, a swipe up may cause the card to switch sides, while a long press may cause the card to be favorited.

At block 250 of the process flow 200, the first card may be caused to be presented at a display of the mobile device. For example, computer-executable instructions stored on a memory of a device may be executed to cause the first card to be presented at a display of the mobile device. The user may interact with the navigation menu, or may initiate the navigation menu, and as a result of the interaction, the mobile device may present the first card at the display.

At optional block 260 of the process flow 200, delivery of content may be caused based at least in part on a user interaction with the first card. In one example, a user may tap a "play" button for audio or video. The server may therefore cause delivery or initiate delivery of content related to the audio or video, that may be played back at the first card itself, without leaving the navigation menu or redirecting the user away from the first card. For example, computer-executable instructions stored on a memory of a device may be executed to cause delivery of content based at least in part on a user interaction with the first card. In some embodiments, a device at which the card is presented may prefetch and/or cache not only the card, but content that is related to the card as well. For example, the device may cache a webpage, images, a video, and the like that the card may be linked to. As a result, load time and latency may be reduced in the event the user interacts with the card.

Figure 3:
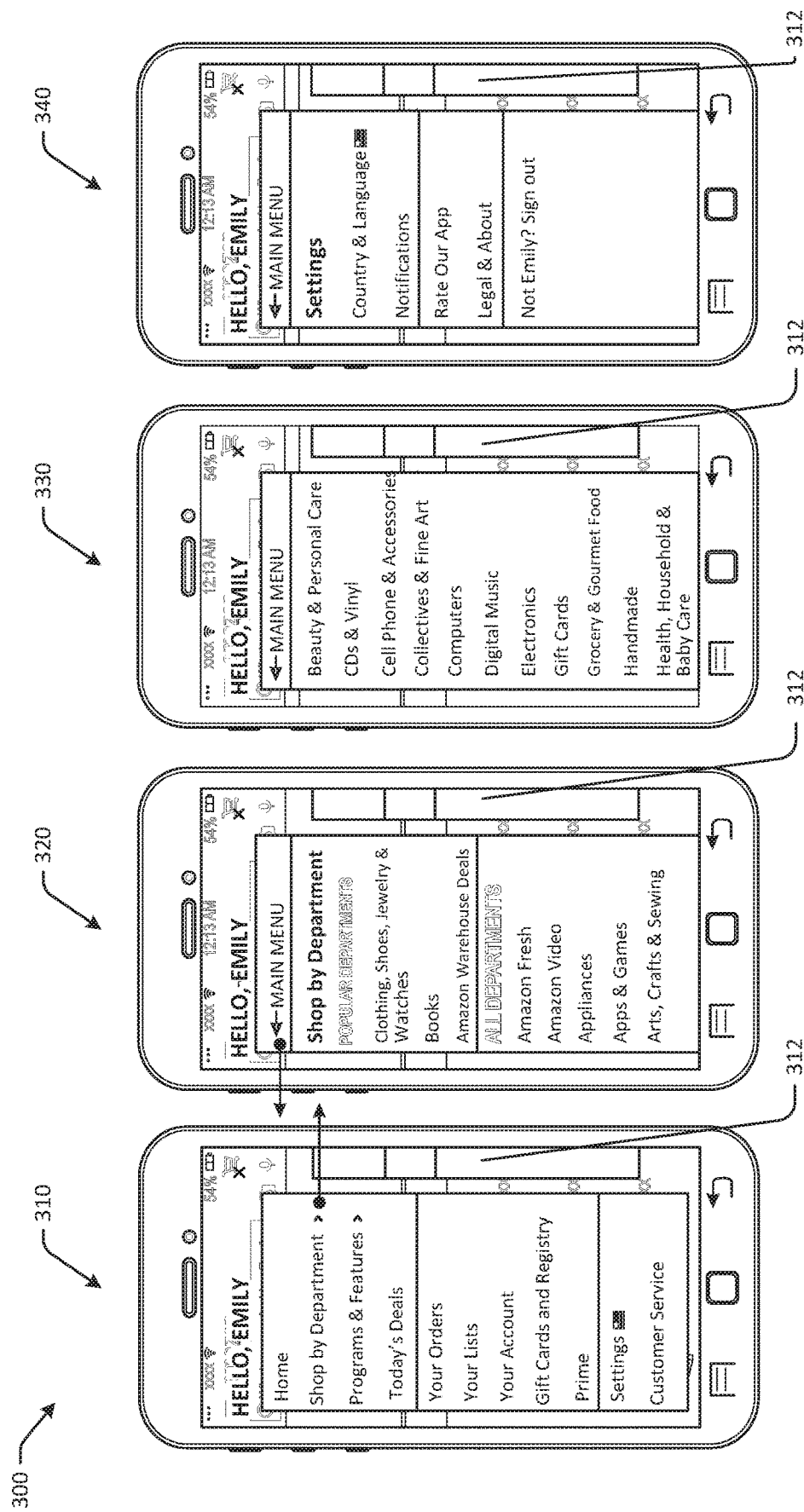
FIG. 3 is a schematic illustration of an example digital navigation menu and sub-menus with swipeable cards in accordance with one or more example embodiments of the disclosure.

FIG. 3 depicts a schematic illustration of an example digital navigation menu 300 and sub-menus with swipeable cards in accordance with one or more example embodiments of the disclosure. In the example of FIG. 3, the digital navigation menu 300 may be a menu of a computing application that can be used to direct users to specific portions of the applications or to specific content. For example, at a first user interface 310, the digital navigation menu 300 may include a number of text-based links that are configured to direct a user to particular categories or portions of the application, or to particular content. The digital navigation menu 300 may include one or more swipeable cards, such as a first card 312, that can be accessed from the digital navigation menu 300. In one example, the first card 312 can be accessed by swiping left from the digital navigation menu 300 portion including text links. If the user selects, for example, the "shop by department" option at the first user interface 310, the user may be directed to a first submenu at a second user interface 320. The first card 312, however, may persist and may be accessible from the first submenu. If the user selects an option at the first submenu, the user may be directed to a second submenu at a third user interface 330. The first card 312 may again persist and be accessible from the second submenu. If the user makes a selection at the second submenu and is directed to a third submenu at a fourth user interface 340, the first card 312 may again persist and be accessible. In some embodiments, the cards may be accessible from any portion of the digital navigation menu 300.

Figure 4:
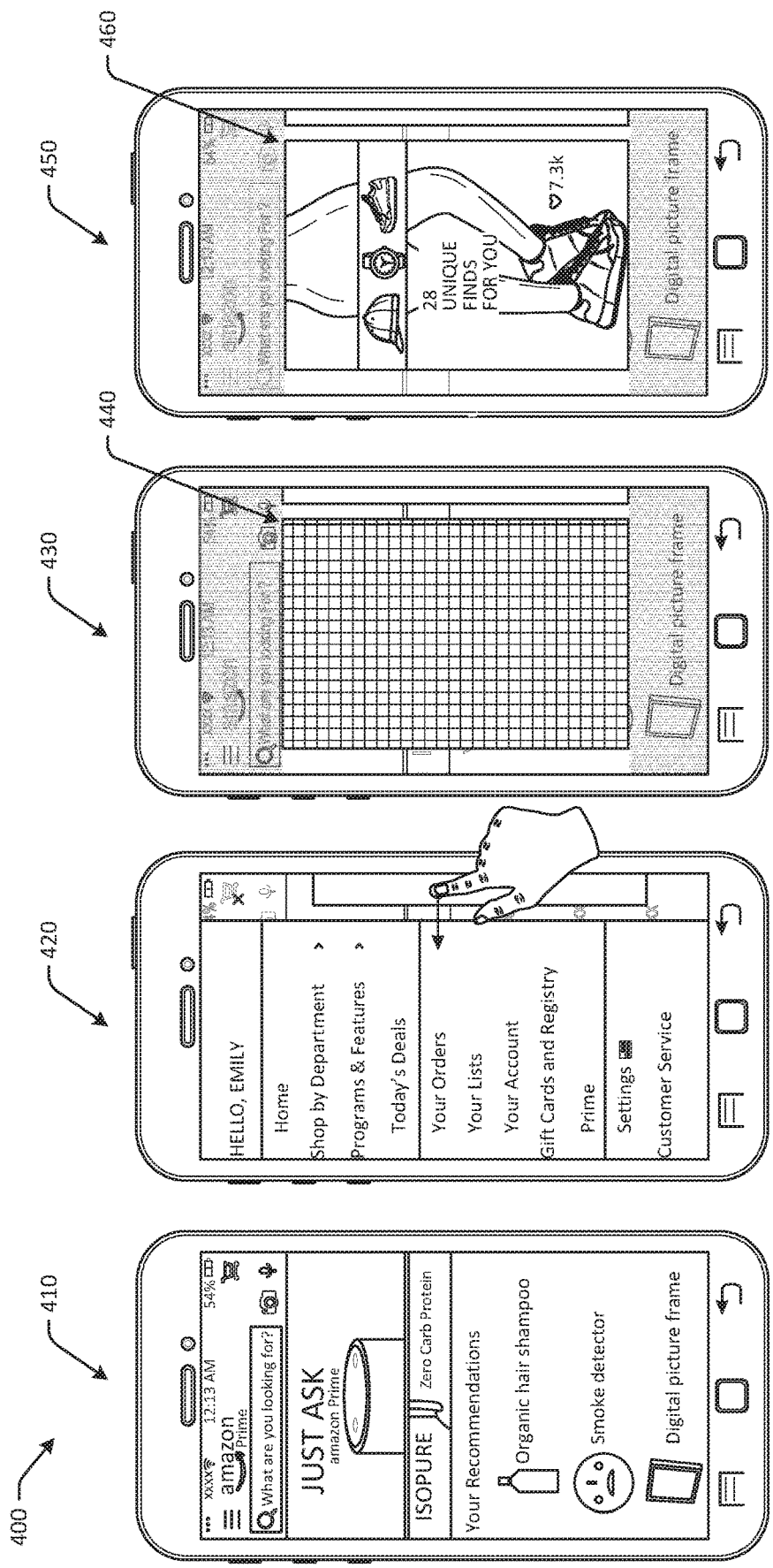
FIG. 4 is a schematic illustration of a digital navigation menu of swipeable cards during a loading process in accordance with one or more example embodiments of the disclosure.

FIG. 4 depicts a schematic illustration of a digital navigation menu of swipeable cards 400 during a loading process in accordance with one or more example embodiments of the disclosure. Certain embodiments may reduce latency in loading and/or presenting card content by loading a basic data file for one or more cards without images before a digital navigation menu is initiated. For example, at a first user interface 410, a user may open an application including a digital navigation menu. When the application is opened or initiated, a basic data file for one or more cards may be loaded before the digital navigation menu is opened or selected. The basic data file may include information such as the total number of cards that can be presented, image URLs or pointers, color blocks for one or more individual cards, and/or other data.

At a second user interface 420, the user may initiate the digital navigation menu. When the menu is opened or initiated, the color attribute(s) for the background of one or more, or the first, card, may be loaded before the card is accessed. For example, while the second user interface 420 is presented, a first card may be partially visible, and the background color or another color attribute for that card may be applied to the partially visible portion of the card.

At a third user interface 430, the user may access the first card, which may automatically transition from the partially visible size in the second user interface 420 to a full size in the third user interface 430. The background color or other color attribute(s) may be applied to the full size card 440 at the third user interface 430. The portions of the user interface other than the card may be blurred, darkened, or otherwise obscured so as to emphasize the card content.

At the fourth user interface 450, the remainder of the content for the card may be loaded and rendered, as shown at the fully rendered card 460. The remainder of the content may include images, links, and other content, and may be presented to the user as the front side of the card. This process may allow for the application to load with low latency, as the full content for one or more of the cards is not downloaded or loaded into memory until just before it is likely to be presented. In addition, by loading the color data before image data, latency is further reduced in presentation of a particular card, while maintaining a seamless user experience.

Figure 5:
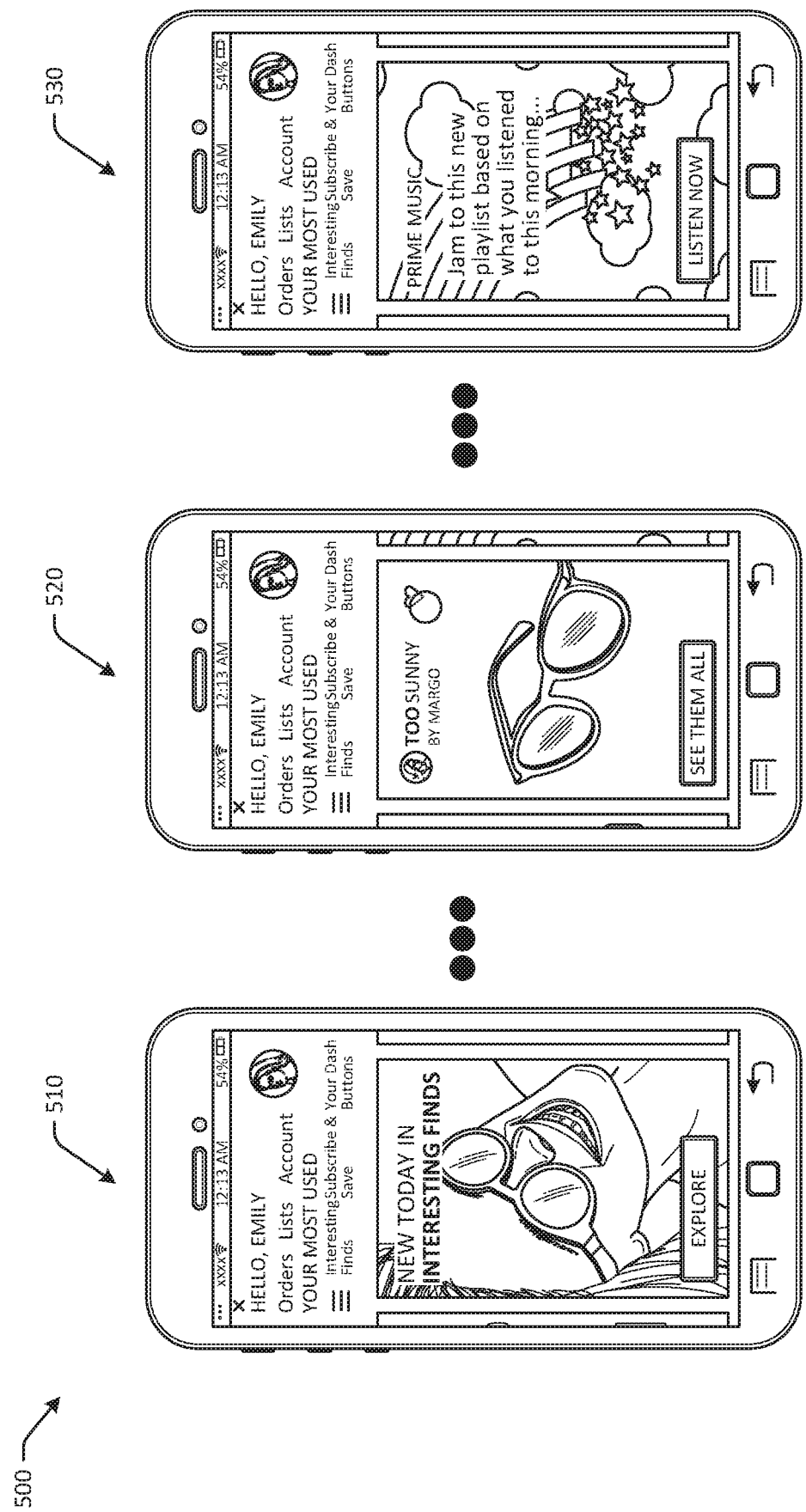
FIG. 5 is a schematic illustration of example swipeable cards and an order of presentation in accordance with one or more example embodiments of the disclosure.

FIG. 5 depicts a schematic illustration of example swipeable cards 500 and an order of presentation in accordance with one or more example embodiments of the disclosure. The swipeable cards 500 may be accessed from a navigation menu of an application. The swipeable cards may be configured to respond to user interactions comprising swipes, taps, flips, drags, long presses, voice input, pinches, three-dimensional touch or force/pressure sensitive inputs, and other user interactions.

A first side of a first card may be presented at a first user interface 510. The first side of the first card may include content related to "new today in interesting finds," and may include an "explore" option. The "explore" option may direct the user to a second side of the first card.

A user may select the "explore" option and may be directed to the second side of the first card at a second user interface 520. The second side of the card may include information about sunglasses that a model was wearing in an image on the first side of the first card. The user may select one or more options related to the sunglasses, or to see additional interesting finds.

At a third user interface 530, the user may navigate to a subsequent card that includes content related to, for example, music recommendations. The user may select an option to play music directly from the card, without being redirected to another application or portion of the application. Music playback and other functionality may therefore be seamlessly integrated into the swipeable cards.

An order of positioning, or an arrangement, may be determined by determining a first user interaction metric for a first card, determining a second user interaction metric for a second card, and determining an order of presentation for the first card and the second card at the digital navigation menu using the first user interaction metric and the second interaction metric. In some embodiments, only one side of a card may be initially presented at the digital navigation menu. User interaction metrics may include popularity, clicks, views, purchases, shares, likes, and other metrics. User interaction metrics may be indicative of user engagement with digital content of a card for a plurality of users. Cards with digital content that has relatively high user interaction metrics may be prioritized, or positioned ahead of, other content as the content may be more relevant or interesting than other content. User interaction metrics may be device type specific and/or device form factor specific. For example, user interaction metrics for users using smartphone devices may be distinguished from user interaction metrics for users using television devices. As a result, selection of content or cards, as well as order of presentation of cards, may be determined based at least in part on a device type or device form factor of the device on which the card will be presented. For example, video-based content may be more likely to be presented at televisions, while micro-game content may be more likely to be presented at smartphones, as more users may be likely to interact with such content on the respective platforms. Cards may be added or removed from a series or queue based at least in part on a device type or form factor at which the card is to be presented.

Figure 6:
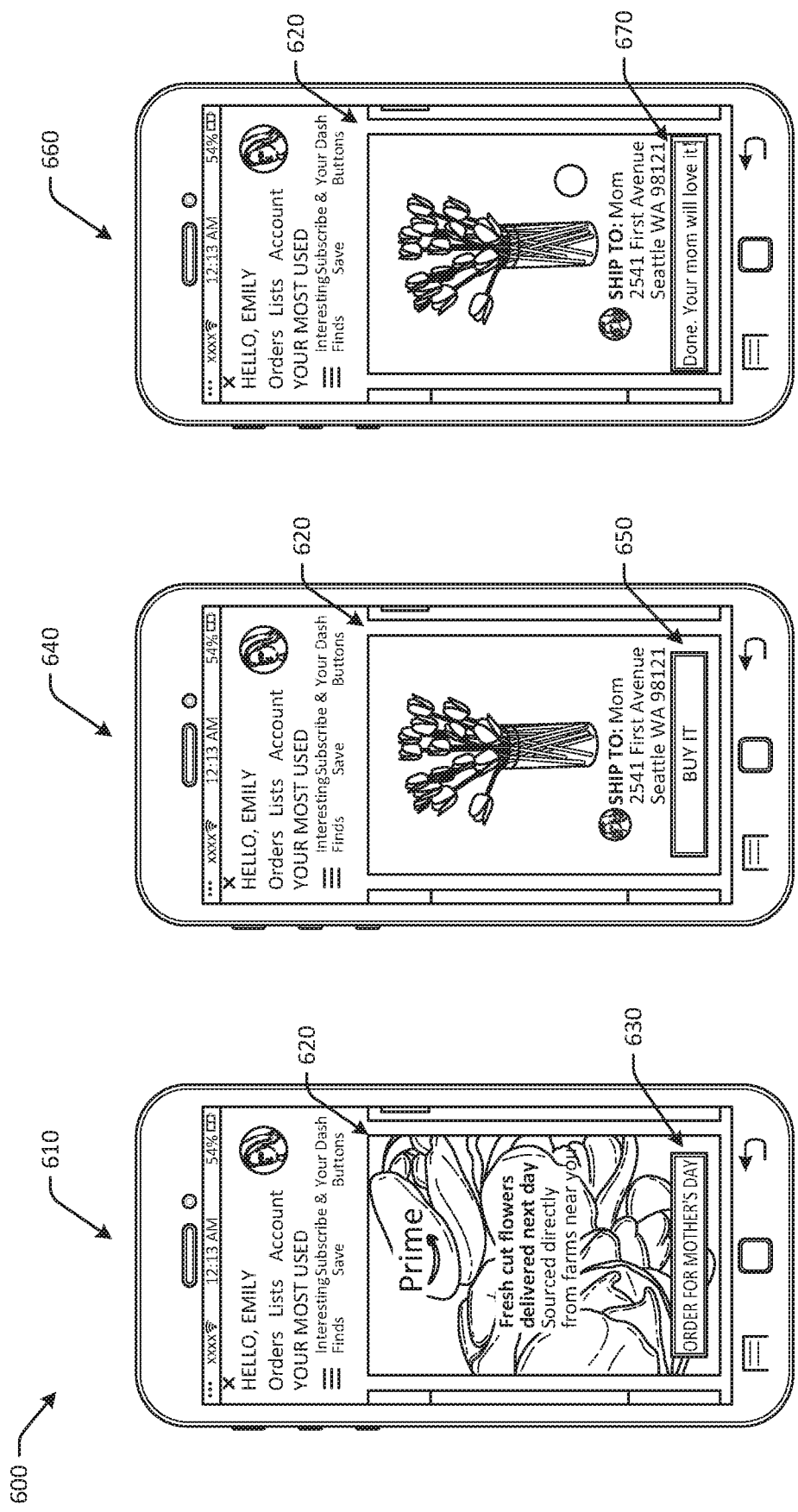
FIG. 6 is a schematic illustration of an example digital navigation menu with various sides of a swipeable card and purchase functionality in accordance with one or more example embodiments of the disclosure.

FIG. 6 depicts a schematic illustration of an example digital navigation menu 600 with various sides of a swipeable card and purchase functionality in accordance with one or more example embodiments of the disclosure. Certain embodiments may include cards with product recommendations and may facilitate purchases of products from within not only the application, but within a particular card.

For example, at a first user interface 610, a first card 620 may include content related to a product recommendation, such as flowers for mother's day or another holiday. The first side of the card that is presented at the first user interface 610 may include an option 630 to order the flowers. The user may select the option and may be directed to a second side of the same first card 620, at which the user's mother's address may be determined (e.g., based at least in part on an address list associated with the user's account, etc.) and automatically entered. The address and product may be presented, along with an option 650 to confirm the purchase. A physical shipment of the flowers may be caused to an address associated with a user profile that is associated with the mobile device, and some content on a card may be replaced with an order confirmation message.

The user may select the option 650, and may be directed to a third user interface 660, at which the same second side of the first card 620 is presented, however, the text of the option 650 has been replaced with an order confirmation indicator 670. Accordingly, users may complete purchases from initiation to completion using the different sides of the card and without leaving the card and/or application. Users may continue to browse cards after completing the purchase.

Figure 7:
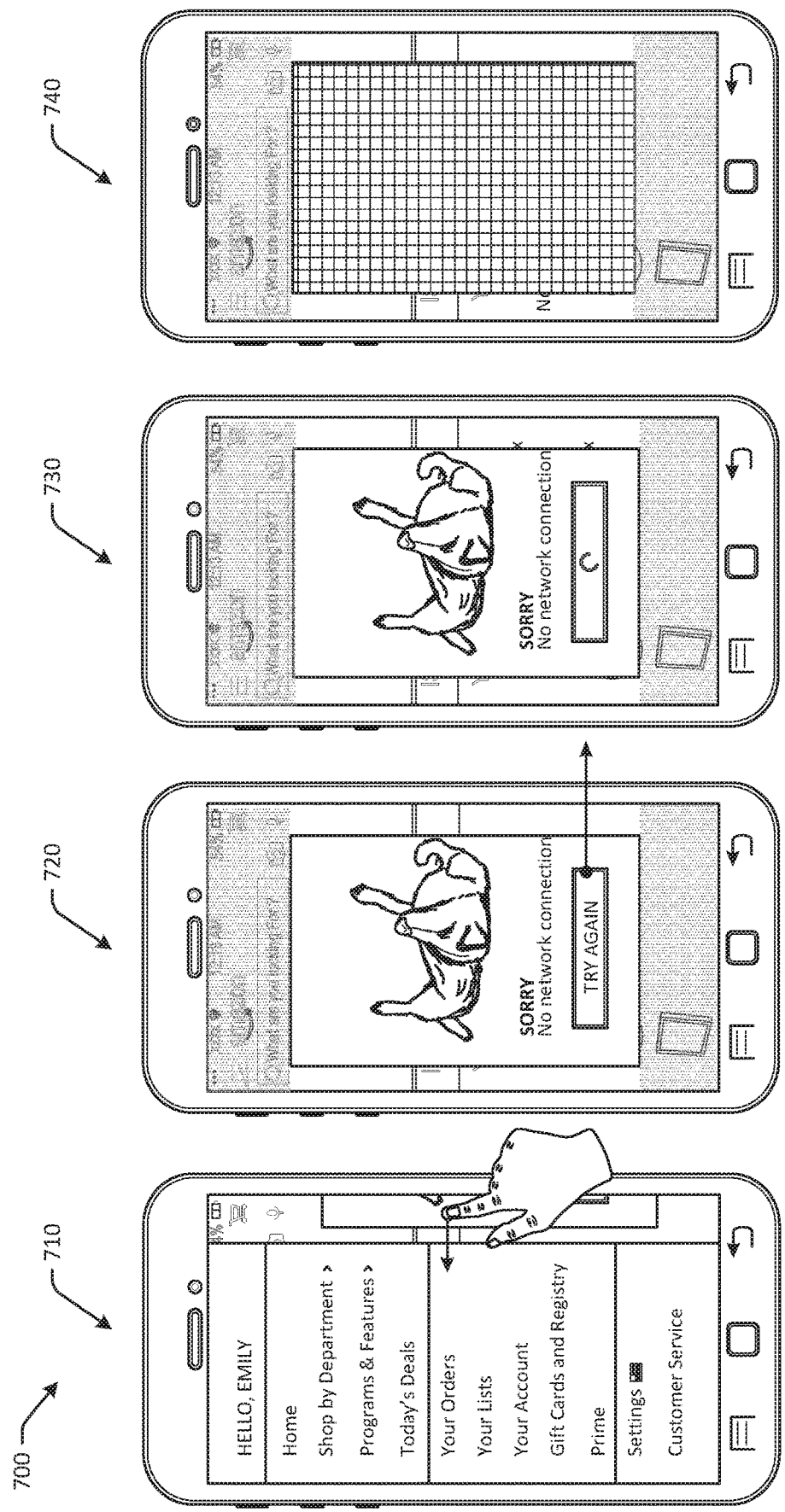
FIG. 7 is a schematic illustration of an example digital navigation menu with swipeable cards during an error in loading cards in accordance with one or more example embodiments of the disclosure.

FIG. 7 depicts a schematic illustration of an example digital navigation menu 700 with swipeable cards during an error in loading cards in accordance with one or more example embodiments of the disclosure. In some instances, because certain card content may not be delivered and/or loaded by a device until it is likely to be used to reduce latency and improve computing performance, errors in loading may occur.

For example, at a first user interface 710, a user may initiate a navigation menu of an application, and may attempt to access a card. The card may be presently unavailable, for example, due to a poor network connection. At a second user interface 720, an error message may be presented in the boundary of the card, with an option to "try again." In some embodiments, an attempt to load the card may be automatically retried. If the reload attempt is again unsuccessful (e.g., after a certain length of time has passed without success or a timeout period has elapsed, etc.), the error message may be presented again at a third user interface 730. At a fourth user interface 740, a JavaScript object notation, or another component of the card, may be loaded. Network connection speed and/or device screen resolution may be factors considered in selecting cards or content for presentation at a particular device (e.g., slow connections may result in less video-based content being selected, etc.).

Figure 8:
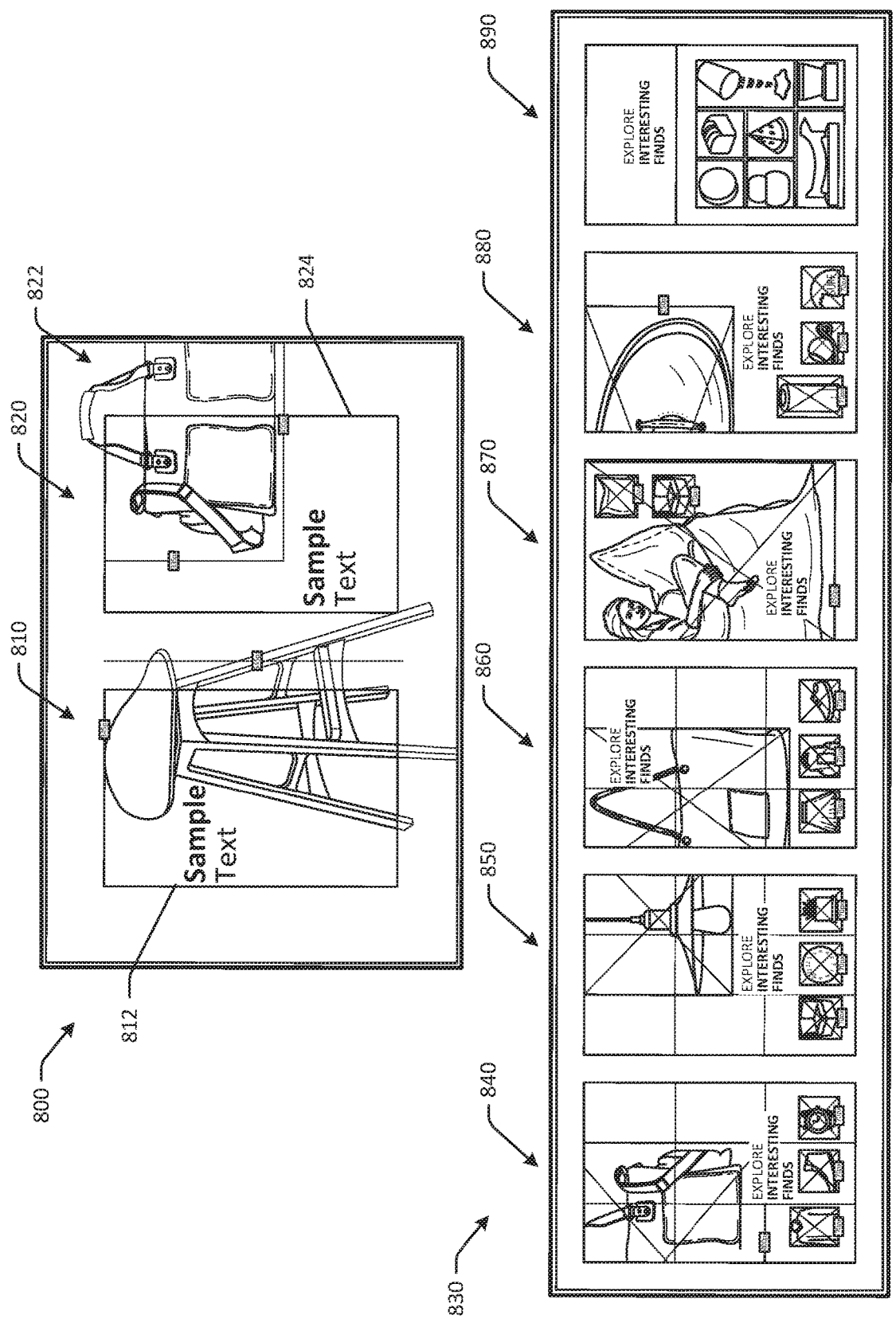
FIG. 8 is a schematic illustration of example swipeable cards with various image positions and arrangements in accordance with one or more example embodiments of the disclosure.

FIG. 8 depicts a schematic illustration of example swipeable cards with various image positions and arrangements in accordance with one or more example embodiments of the disclosure.

A first set of cards 800 includes a first card 810 and a second card 820. Certain embodiments may generate one or more of the swipeable cards. For example, in some embodiments, a remote server may generate cards, while in another embodiment, devices may locally generate cards for presentation. In other embodiments, portions of cards may be determined or generated in distributed computing environments.

Generation of cards may include color selection, text content and attribute (e.g., font size, font, placement within the card, etc.) determinations, image selection, image/product placement determinations, layering determinations, and/or other factors. For example, the first card 810 may include text with a portion that is bolded and positioned in a certain location within a boundary 812 of the card. The first card 810 may also include an image of a stool that has a particular positioning, where a portion of the stool is positioned beyond or across the boundary 812. For example, the leg of the stool is extended beyond the boundary towards the second card 820. In some embodiments, the portion of the image or product that is outside the boundary 812 may be visible but may be slightly obscured. In other embodiments, the outlying portion may be cropped. Machine learning algorithms may be used to determine one or more aspects or features of a card, including image or product placement.

Similarly, in the second card 820, a purse 822 may be positioned in a corner of the second card 820 with a portion extending beyond a boundary 824 of the second card 820. Such placement may be visually pleasing and may interest or engage the user more so than, for example, images of products where the images are of uniform size and center aligned, and so forth.

To generate a card, such as a card with a first product and a second product, one or more computer systems may generate a boundary for a card, and may determine that a first color of the first product is different than a second color of the second product. The computer system may determine that a first size of the first product is larger than a second size of the second product, and may determine a background color for the first card using the first color, since the first product is larger than the second product. The computer system may determine a first position of the first product with respect to the boundary, wherein at least a portion of the first product is positioned outside the boundary, and may determine a second position of the second product with respect to the boundary, and may generate the first digital content for the card accordingly.

FIG. 8 includes another set of cards 830 that illustrate various manners in which a card related to "explore interesting finds" can be generated. Certain aspects of cards may be customized to particular users, such as to incorporate particular colors for specific genders or a favorite color of a user. For example, a first card 840 may include a bag and men's accessories, where the bag is positioned at a top left side of the card and the accessories are positioned in a row. A second card 850 may include housewares with similar positioning. A third card 860 may be formulated for women, and may therefore include a women's bag instead of the men's bag in the first card 840, and women's accessories instead of men's accessories. A fourth card 870 provides an example of different positioning of housewares, while a fifth card 880 illustrates housewares in a format similar to the first card 840. A sixth card 890 is an example of a different format altogether.

Figure 9:
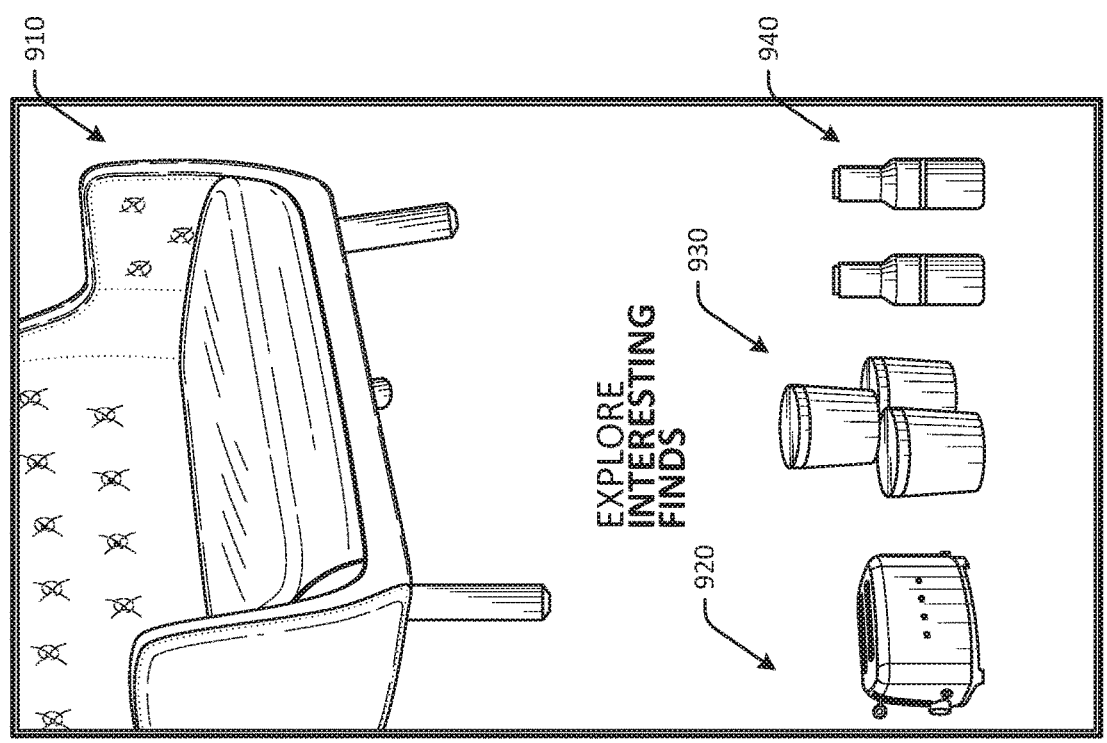
FIG. 9 is a schematic illustration of an example swipeable card with products selected based at least in part on a product color in accordance with one or more example embodiments of the disclosure.

FIG. 9 depicts a schematic illustration of an example swipeable card 900 with products selected based at least in part on a product color in accordance with one or more example embodiments of the disclosure. In FIG. 9, the card 900 may include a couch 910, a toaster 920, containers 930, and thermoses 940. The products selected for inclusion in the card 900 may be based at least in part on the user profile of the user to whom the card will be presented. In addition, the colors of the respective products may be determined based at least in part on the largest object, or in FIG. 9, the couch 910. For example, if the couch 910 has a majority sea green color, the toaster 920 and containers 930 may be depicted in a similar color. The background color of the card 900 may be a contrasting color or another color that is aesthetically pleasing in view of the sea green couch 910. The card 900 may include an accent object color to provide contrast an increase a level of appeal or interest of the card 900 to users. For example, the thermoses 940 may be depicted in an orange color or another color to offset the thermoses 940 from the background color and/or the other products on the card 900.

One or more operations of the methods, process flows, or use cases of FIGS. 1-9 may have been described above as being performed by a user device, or more specifically, by one or more program module(s), applications, or the like executing on a device. It should be appreciated, however, that any of the operations of the methods, process flows, or use cases of FIGS. 1-9 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-9 may be described in the context of the illustrative devices, it should be appreciated that such operations may be implemented in connection with numerous other device configurations.

The operations described and depicted in the illustrative methods, process flows, and use cases of FIGS. 1-9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 10:
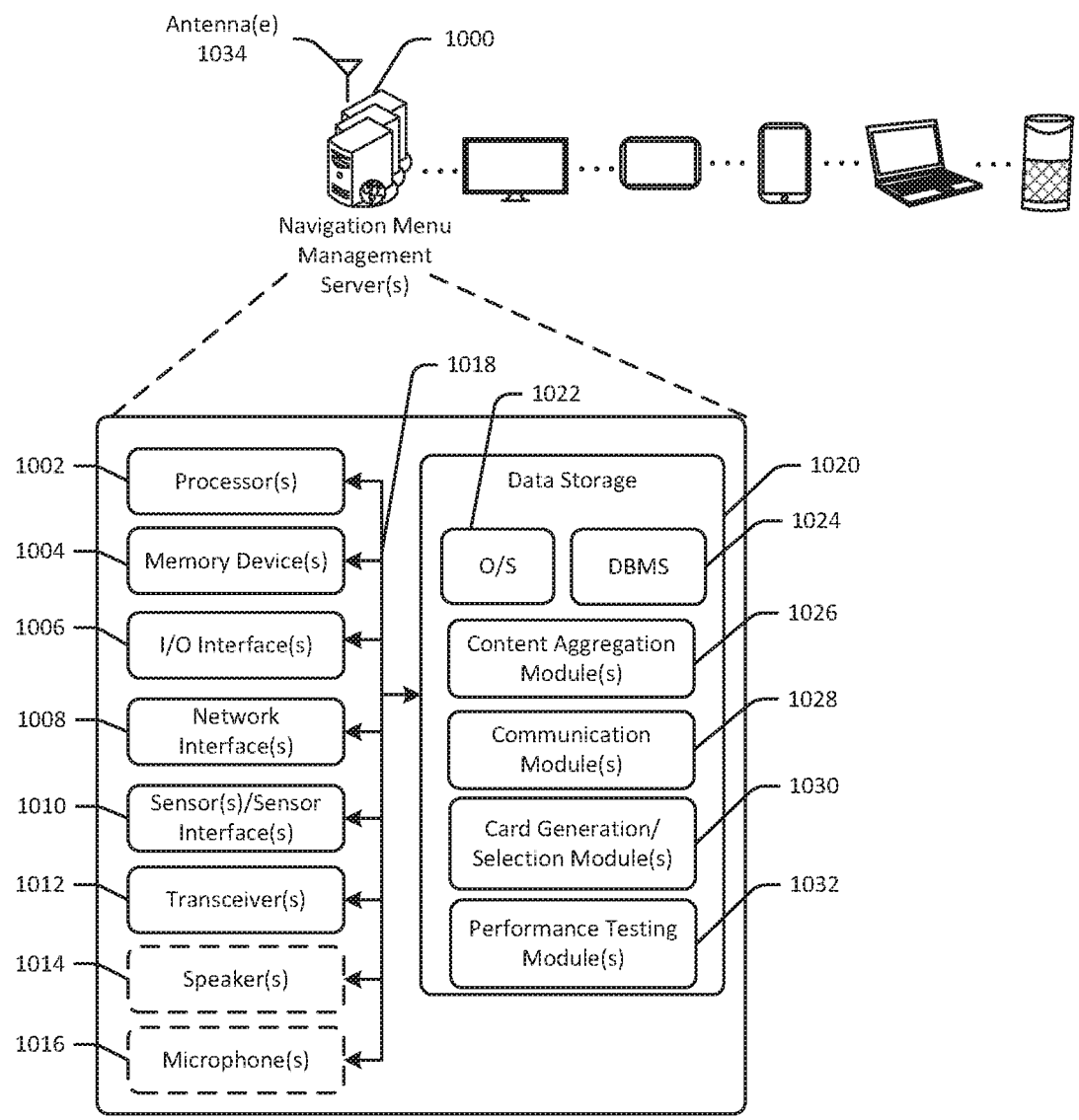
FIG. 10 is a schematic block diagram of an illustrative computer device in accordance with one or more example embodiments of the disclosure.

FIG. 10 is a schematic block diagram of an illustrative navigation menu generation server(s) 1000 in accordance with one or more example embodiments of the disclosure. The navigation menu generation server(s) 1000 may include any suitable computing device capable of receiving and/or generating data and generating user interfaces or components, including, but not limited to, a streaming audio device, a mobile device such as a smartphone, tablet, e-reader, wearable device, or the like; a desktop computer; a laptop computer; a content streaming device; a set-top box; or the like. The navigation menu generation server(s) 1000 may correspond to an illustrative device configuration for the remote servers of FIGS. 1-9. In some embodiments, the navigation menu generation server(s) 1000 may be one server in a fleet of servers, or may be a group of servers, or may be a single server. In some embodiments, a single remote server or single group of remote servers may be configured to perform more than one type of product recommendation and/or search query tracking functionality.

The navigation menu generation server(s) 1000 may be configured to communicate via one or more networks 1040. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the navigation menu generation server(s) 1000 may include one or more processors (processor(s)) 1002, one or more memory devices 1004 (generically referred to herein as memory 1004), one or more input/output (I/O) interface(s) 1006, one or more network interface(s) 1008, one or more sensors or sensor interface(s) 1010, one or more transceivers 1012, one or more optional speakers 1014, one or more optional microphones 1016, and data storage 1020. The navigation menu generation server(s) 1000 may further include one or more buses 1018 that functionally couple various components of the navigation menu generation server(s) 1000. The navigation menu generation server(s) 1000 may further include one or more antenna(e) 1034 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1018 may include at least one of a system bus, a memory bus, an address bus, or a message bus, and may permit exchange of information (e.g., data (including computer-executable code), signaling, etc.) between various components of the navigation menu generation server(s) 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the navigation menu generation server(s) 1000 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1020 for non-volatile storage.

More specifically, the data storage 1020 may store one or more operating systems (O/S) 1022; one or more database management systems (DBMS) 1024; and one or more program module(s), applications, engines, computer-executable code, scripts, or the like such as, for example, one or more content aggregation module(s) 1026, one or more communication module(s) 1028, one or more card generation/selection module(s) 1030, and/or one or more performance testing module(s) 1032. Some or all of these module(s) may be sub-module(s). Any of the components depicted as being stored in data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in data storage 1020 may support functionality described in reference to correspondingly named components earlier in this disclosure.

The data storage 1020 may further store various types of data utilized by components of the navigation menu generation server(s) 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 10, the datastore(s) may include, for example, purchase history information, device identifier information, user profile information, and other information.

The processor(s) 1002 may be configured to access the memory 1004 and execute computer-executable instructions loaded therein. For example, the processor(s) 1002 may be configured to execute computer-executable instructions of the various program module(s), applications, engines, or the like of the navigation menu generation server(s) 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 10, the content aggregation module(s) 1026 may include computer-executable instructions, code, or the like that responsive to execution by one or more of the processor(s) 1002 may perform functions including, but not limited to, determining candidate content, determining real-time or near real-time user interaction metrics for a number of different pieces of content or cards from a plurality of user devices, receiving user interaction data from a plurality of devices, determining impression counts, determining content or card arrangement, and the like.

The communication module(s) 1028 may include computer-executable instructions, code, or the like that responsive to execution by one or more of the processor(s) 1002 may perform functions including, but not limited to, communicating with one or more devices, for example, via wired or wireless communication, communicating with remote servers, communicating with remote datastores, sending or receiving notifications, communicating with cache memory data, and the like.

The card generation/selection module(s) 1030 may include computer-executable instructions, code, or the like that responsive to execution by one or more of the processor(s) 1002 may perform functions including, but not limited to, monitoring user interaction events, determining card performance data, determining card positioning and/or arrangement, determining card rankings, determining user preferences, determining user interaction histories, determining image placement and layering, determining a number of images to present for a particular side of a card, determining whether any portion of an image will extend beyond a card boundary, determining initial card boundaries, determining card functionality, generating cards, and the like.

The performance testing module(s) 1032 may include computer-executable instructions, code, or the like that responsive to execution by one or more of the processor(s) 1002 may perform functions including, but not limited to, determining a number of user interactions and/or certain events that users engage with on cards, determining card performance, determining sub-card metrics, such as color and user interaction data, placement and user interaction data, determining and/or querying user devices for interaction metrics, and the like.

Referring now to other illustrative components depicted as being stored in the data storage 1020, the O/S 1022 may be loaded from the data storage 1020 into the memory 1004 and may provide an interface between other application software executing on the navigation menu generation server(s) 1000 and hardware resources of the navigation menu generation server(s) 1000. More specifically, the O/S 1022 may include a set of computer-executable instructions for managing hardware resources of the navigation menu generation server(s) 1000 and for providing common services to other application programs (e.g., managing memory allocation among various application programs). In certain example embodiments, the O/S 1022 may control execution of the other program module(s) to dynamically enhance characters for content rendering. The O/S 1022 may include any operating system now known or which may be developed in the future including, but not limited to, any server operating system, any mainframe operating system, or any other proprietary or non-proprietary operating system.

The DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the navigation menu generation server(s) 1000 is a mobile device, the DBMS 1024 may be any suitable lightweight DBMS optimized for performance on a mobile device.

Referring now to other illustrative components of the navigation menu generation server(s) 1000, the input/output (I/O) interface(s) 1006 may facilitate the receipt of input information by the navigation menu generation server(s) 1000 from one or more I/O devices as well as the output of information from the navigation menu generation server(s) 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the navigation menu generation server(s) 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more of the antenna(e) 1034 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The navigation menu generation server(s) 1000 may further include one or more network interface(s) 1008 via which the navigation menu generation server(s) 1000 may communicate with any of a variety of other systems, platforms, networks, devices, and so forth. The network interface(s) 1008 may enable communication, for example, with one or more wireless routers, one or more host servers, one or more web servers, and the like via one or more of networks.

The antenna(e) 1034 may include any suitable type of antenna depending, for example, on the communications protocols used to transmit or receive signals via the antenna (e) 1034. Non-limiting examples of suitable antennas may include directional antennas, non-directional antennas, dipole antennas, folded dipole antennas, patch antennas, multiple-input multiple-output (MIMO) antennas, or the like. The antenna(e) 1034 may be communicatively coupled to one or more transceivers 1012 or radio components to which or from which signals may be transmitted or received.

As previously described, the antenna(e) 1034 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1034 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1034 may be configured to transmit or receive radio frequency signals within any suitable frequency range forming part of the unlicensed portion of the radio spectrum.

The antenna(e) 1034 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna(e) 1034—transmitting or receiving radio frequency (RF) signals in the bandwidth and/or channels corresponding to the communications protocols utilized by the navigation menu generation server(s) 1000 to communicate with other devices. The transceiver(s) 1012 may include hardware, software, and/or firmware for modulating, transmitting, or receiving—potentially in cooperation with any of antenna(e) 1034—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the navigation menu generation server(s) 1000. The transceiver (s) 1012 may further include a low noise amplifier (LNA), additional signal amplifiers, an analog-to-digital (A/D) converter, one or more buffers, a digital baseband, or the like.

The sensor(s)/sensor interface(s) 1010 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 1014 may be any device configured to generate audible sound. The optional microphone(s) 1016 may be any device configured to receive analog sound input or voice data.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the navigation menu generation server(s) 1000, and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the navigation menu generation server(s) 1000 may include alternate and/or additional hardware, software, or firmware components beyond those described or depicted without departing from the scope of the disclosure. More particularly, it should be appreciated that software, firmware, or hardware components depicted as forming part of the navigation menu generation server(s) 1000 are merely illustrative and that some components may not be present or additional components may be provided in various embodiments. While various illustrative program module(s) have been depicted and described as software module(s) stored in data storage 1020, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by one or more computer processors coupled to at least one memory, a first request from a mobile device for digital content to be presented at a plurality of cards in a digital navigation menu, wherein the plurality of cards comprise floating user interface elements that can be swiped in succession, each card of the plurality of cards having two sides;
   generating a boundary for a first card, wherein dimensions of the first card are adjusted based at least in part on content on a presented side of the first card;
   determining a first position of a first product with respect to the boundary, wherein at least a portion of the first product is positioned outside the boundary;
   determining a second position of a second product with respect to the boundary, wherein the entire second product is positioned inside the boundary;
   generating first content for the first card, the first content comprising the first product disposed at the first position with respect to the boundary, and the second product disposed at the second position with respect to the boundary;
   selecting the first card from the plurality of cards, the first card comprising the first content on a first side, and second content on a second side, wherein the second content-comprises a first text-based link;
   causing the first card to be presented at a display of a mobile device;
   determining that the second content has been presented; and
   based at least in part on the determination that the first text-based link has been selected, causing the second content on the second side to be replaced with an order confirmation message;
   wherein respective cards of the plurality of cards comprise content from unrelated categories.

2. The method of claim 1, wherein only one side of a card is presented at the digital navigation menu.

3. The method of claim 1, wherein the first content first text-based link comprises a selectable element, the method further comprising:
   determining a selection of the selectable element; and
   causing shipment of a product to an address associated with a user profile that is associated with the mobile device.

4. The method of claim 1, wherein the plurality of cards are configured to respond to user interactions comprising swipes, taps, flips, drags, long presses, voice inputs, pinches, and three-dimensional touch or force/pressure sensitive inputs.

5. The method of claim 1, further comprising:
   sending first data associated with the first card, wherein the first data comprises instructions for a first response to a first user gesture interaction with the first card, and a second response to a second user gesture interaction with the first card.

6. The method of claim 1, wherein content presented at the plurality of cards comprises social media content, recommendation content, editorial content, audio content, and video content.

7. The method of claim 1, wherein content presented at the plurality of cards is sourced from an online community associated with a user profile that is associated with the mobile device.

8. The method of claim 1, wherein the plurality of cards are only accessible from the digital navigation menu.

9. The method of claim 1, wherein the plurality of cards are updated periodically.

10. A device comprising:
    at least one memory that stores computer-executable instructions; and
    at least one processor configured to access the at least one memory and execute the computer-executable instructions to:
    determine a first request from a mobile device for digital content to be presented at a plurality of cards in a digital navigation menu, wherein the plurality of cards comprise floating user interface elements that can be swiped in succession and each card of the plurality of cards has two sides;
    generate a boundary for a first card, wherein dimensions of the first card are adjusted based at least in part on content on a presented side of the first card;
    determine a first position of a first product with respect to the boundary, wherein at least a portion of the first product is positioned outside the boundary;
    determine a second position of a second product with respect to the boundary, wherein the entire second product is positioned inside the boundary;
    generate first content for the first card, the first content comprising the first product disposed at the first position with respect to the boundary, and the second product disposed at the second position with respect to the boundary;

select the first card from the plurality of cards, the first card comprising the first content on a first side, and second content on a second side, wherein the second content comprises a first text-based link;

cause the first card to be presented at a display of a mobile device;

determine that the second content has been presented; and based at least in part on the determination that the first text-based link has been selected, causing the second content on the on the second side to be replaced with an order confirmation message;

wherein respective cards of the plurality of cards comprise content from unrelated cards.

11. The device of claim 10, wherein only one side of a card is presented at the digital navigation menu.

12. A method comprising:

determining, by one or more computer processors coupled to at least one memory, a request from a mobile device for digital content to be presented at a plurality of cards in a digital navigation menu, wherein the plurality of cards comprise floating user interface elements that can be swiped in succession and each card of the plurality of cards has two sides;

generating a boundary for a first card, wherein dimensions of the first card are adjusted based at least in part on content on a presented side of the first card;

determining that a first size of a first product is larger than a second size of a second product;

determining a first position of the first product with respect to the boundary based at least in part on the determination that the first size is larger than the second size;

determining a second position of the second product with respect to the boundary;

generating first content for the first card, the first content comprising the first product disposed at the first position with respect to the boundary, and the second product disposed at the second position with respect to the boundary;

selecting the first card from the plurality of cards, the first card comprising the first content on a first side and second content on a second side, wherein the second content-comprises a first text-based link;

causing the first card to be presented at a display of a mobile device;

determining that the second content has been presented; and based at least in part on the determination that the first text-based link has been selected, causing the second content on the second side to be replaced with an order confirmation message;

wherein respective cards of the plurality of cards comprise content from unrelated categories.

13. The method of claim 12, wherein the first text-based link comprises a selectable element, the method further comprising:

determining a selection of the selectable element; and causing shipment of a product to an address associated with a user profile that is associated with the mobile device.

14. The method of claim 12, wherein the plurality of cards are configured to respond to user interactions comprising swipes, taps, flips, drags, long presses, voice inputs, pinches, and three-dimensional touch or force/pressure sensitive inputs.

15. The method of claim 12, further comprising:

sending first data associated with the first card to the mobile device, wherein the first data comprises instructions for a first response to a first user gesture interaction with the first card, and a second response to a second user gesture interaction with the first card.

16. The method of claim 12, wherein content presented at the plurality of cards comprises social media content, recommendation content, editorial content, audio content, and video content.

17. The method of claim 12, wherein content presented at the plurality of cards is sourced from an online community associated with a user profile that is associated with the mobile device.

* * * * *

UNITED STATES PATENT AND TRADEMARK OFFICE
CERTIFICATE OF CORRECTION

| | |
|---|---|
| PATENT NO. | : 11,281,354 B1 |
| APPLICATION NO. | : 15/619861 |
| DATED | : March 22, 2022 |
| INVENTOR(S) | : Jeff Gelfuso et al. |

It is certified that error appears in the above-identified patent and that said Letters Patent is hereby corrected as shown below:

In the Claims

Column 22, Line 13, "3. The method of claim 1, wherein the first content first text-based link comprises a selectable element, the method further comprising:" should read -- 3. The method of claim 1, wherein the first text-based link comprises a selectable element, the method further comprising: --.

Signed and Sealed this
Thirty-first Day of May, 2022

Katherine Kelly Vidal
*Director of the United States Patent and Trademark Office*